US012203743B2

(12) United States Patent
Engman

(10) Patent No.: US 12,203,743 B2
(45) Date of Patent: Jan. 21, 2025

(54) METHOD AND DEVICE FOR INSPECTION OF A GEOMETRY, THE DEVICE COMPRISING IMAGE CAPTURING AND SHAPE SCANNING MEANS

(71) Applicant: Winteria AB, Hudiksvall (SE)

(72) Inventor: Martin Engman, Hudiksvall (SE)

(73) Assignee: Winteria AB, Hudiksvall (SE)

( * ) Notice: Subject to any disclaimer, the term of this patent is extended or adjusted under 35 U.S.C. 154(b) by 37 days.

(21) Appl. No.: 17/755,053

(22) PCT Filed: Oct. 22, 2020

(86) PCT No.: PCT/SE2020/051024
§ 371 (c)(1),
(2) Date: Apr. 20, 2022

(87) PCT Pub. No.: WO2021/080498
PCT Pub. Date: Apr. 29, 2021

(65) Prior Publication Data
US 2022/0364851 A1    Nov. 17, 2022

(30) Foreign Application Priority Data
Oct. 23, 2019  (SE) .................................. 1951205-2

(51) Int. Cl.
*G06K 9/00*  (2022.01)
*G01B 11/02*  (2006.01)
(Continued)

(52) U.S. Cl.
CPC ............ *G01B 11/24* (2013.01); *G01B 11/026* (2013.01); *G01C 11/025* (2013.01); *G01C 11/06* (2013.01);
(Continued)

(58) Field of Classification Search
CPC ..... G06T 7/0002; G06T 7/0004; G06T 7/277; G06T 7/30; G06T 7/32; G06T 7/50;
(Continued)

(56) References Cited

U.S. PATENT DOCUMENTS 9,693,040 B2 *   6/2017  Hillebrand ................ G06T 7/74
10,708,574 B2 *  7/2020  Furst ...................... H04N 23/55
(Continued)

FOREIGN PATENT DOCUMENTS

JP    2018205092 A    12/2018
WO   2013061976 A1    5/2013

OTHER PUBLICATIONS

International Search Report & Written Opinion, Nov. 9, 2020, Swedish Intellectual Property Office, Stockholm, Sweden.
(Continued)

*Primary Examiner* — Eric Rush
(74) *Attorney, Agent, or Firm* — Noréns Patentbyrå Ab

(57) ABSTRACT

Method for inspecting a geometry (10) having a surface (11), which method uses an inspection device (100) having a digital image capturing means (120) and a shape scanning means (130), comprising the steps of
a) orienting the inspection device (100) in a first orientation;
b) depicting the surface (11) to produce a first image;
c) measuring a shape of a first geometry part to produce a first shape;
d) moving the inspection device (100) to a second orientation;
e) depicting the surface (11) to produce a second image;
f) measuring a second part of said geometry (10) to produce a second shape;
g) using digital image processing based on said first and second images, determining a geometric orientation difference between said first and second orientations;
(Continued)

h) determining a geometric relation between the first and second shapes; and i) producing a data representation of said geometry based on said first shape, said second shape and said geometric relation.

The invention also relates to a device.

13 Claims, 10 Drawing Sheets

(51) Int. Cl.
| | |
|---|---|
| G01B 11/24 | (2006.01) |
| G01C 11/02 | (2006.01) |
| G01C 11/06 | (2006.01) |
| G01S 17/06 | (2006.01) |
| G01S 17/46 | (2006.01) |
| G01S 17/86 | (2020.01) |
| G01S 17/89 | (2020.01) |
| G06T 7/00 | (2017.01) |
| G06T 7/277 | (2017.01) |
| G06T 7/32 | (2017.01) |
| G06T 7/50 | (2017.01) |
| G06T 7/521 | (2017.01) |
| G06T 7/579 | (2017.01) |
| G06T 7/60 | (2017.01) |
| G06T 7/70 | (2017.01) |

(52) U.S. Cl.
CPC .............. *G01S 17/06* (2013.01); *G01S 17/46* (2013.01); *G01S 17/86* (2020.01); *G01S 17/89* (2013.01); *G06T 7/0004* (2013.01); *G06T 7/277* (2017.01); *G06T 7/32* (2017.01); *G06T 7/50* (2017.01); *G06T 7/521* (2017.01); *G06T 7/579* (2017.01); *G06T 7/60* (2013.01); *G06T 7/70* (2017.01); *G06T 7/97* (2017.01); *G06T 2200/24* (2013.01); *G06T 2207/10028* (2013.01); *G06T 2207/20056* (2013.01); *G06T 2207/30108* (2013.01); *G06T 2207/30136* (2013.01); *G06V 2201/12* (2022.01)

(58) Field of Classification Search
CPC ........... G06T 7/521; G06T 7/55; G06T 7/579; G06T 7/60; G06T 7/70; G06T 7/97; G06T 2200/24; G06T 2207/10028; G06T 2207/20056; G06T 2207/30108; G06T 2207/30136; G06T 2207/30164; G01B 11/026; G01B 11/24; G01B 11/25; G01B 11/2513; G01B 11/2518; G01C 11/02; G01C 11/025; G01C 11/06; G01C 11/08; G01C 11/12; G01C 11/28; G01S 17/00; G01S 17/02; G01S 17/06; G01S 17/08; G01S 17/42; G01S 17/46; G01S 17/48; G01S 17/50; G01S 17/58; G01S 17/86; G01S 17/87; G01S 17/88; G01S 17/89; G01S 17/894; G06V 2201/12
USPC ....... 382/100, 101, 103, 106, 108, 141–143, 382/145–147, 149–154, 181, 209, 217, 382/218, 254, 260, 261, 276, 278, 280, 382/286, 291, 293–295, 325; 345/418–420, 629; 348/86, 92, 125–128, 348/135, 142; 356/2, 601–603, 606–608, 356/613, 625, 388, 390, 237.1, 237.2, 356/237.3; 702/127, 150–153, 155, 156, 702/166, 167
See application file for complete search history.

(56) References Cited

U.S. PATENT DOCUMENTS

| | | | |
|---|---|---|---|
| 11,281,176 B2* | 3/2022 | Thomson | G06T 7/75 |
| 2008/0063298 A1* | 3/2008 | Zhou | G06V 10/243 |
| | | | 382/280 |
| 2008/0075326 A1* | 3/2008 | Otani | G06T 7/55 |
| | | | 382/106 |
| 2009/0257680 A1* | 10/2009 | Dhand | G06T 7/32 |
| | | | 382/284 |
| 2010/0188504 A1* | 7/2010 | Dimsdale | G01C 11/06 |
| | | | 382/106 |
| 2012/0194513 A1 | 8/2012 | Sakurai et al. | |
| 2014/0363048 A1 | 12/2014 | Vrcelj et al. | |
| 2015/0377606 A1* | 12/2015 | Thielemans | G01B 11/02 |
| | | | 356/625 |
| 2015/0381968 A1* | 12/2015 | Arora | G06T 7/55 |
| | | | 348/47 |
| 2016/0061954 A1 | 3/2016 | Walsh et al. | |
| 2016/0073085 A1* | 3/2016 | Hillebrand | G06T 7/30 |
| | | | 348/51 |
| 2017/0220887 A1* | 8/2017 | Fathi | G06V 20/10 |
| 2017/0276260 A1* | 9/2017 | Bonel | G01B 11/2518 |
| 2018/0005433 A1 | 1/2018 | Kohler et al. | |
| 2018/0158200 A1 | 6/2018 | Metzler et al. | |
| 2019/0033064 A1* | 1/2019 | Becker | G06T 7/62 |
| 2019/0337344 A1* | 11/2019 | Yu | G06T 7/74 |
| 2020/0043186 A1* | 2/2020 | Selviah | G06T 7/33 |
| 2021/0223397 A1* | 7/2021 | Bertoni | G06T 7/55 |

OTHER PUBLICATIONS

Zagorchev L., et al., A paintbrush laser range scanner, 2005.
Extended European Search Report, Nov. 10, 2022, European Patent Office, Munich, Germany.

* cited by examiner

METHOD AND DEVICE FOR INSPECTION OF A GEOMETRY, THE DEVICE COMPRISING IMAGE CAPTURING AND SHAPE SCANNING MEANS

The present invention relates to a method and a device for inspection of a geometry. In particular, the inspection can be of the geometry of a particular entity, such as a manufactured part, detail or assembly. In particular, such inspection takes place using a wireless scanning, such as using a laser to measure a distance to the inspected geometry. Furthermore, the present device is a device which is movable in relation to the geometry, and the method uses movement of such a device along the geometry to perform said scanning.

In many situations within manufacturing, inspection, maintenance, quality testing, and so forth, it is desirable to inspect various geometries and to determine a data representation of the inspected geometry in question, such as a virtual model of one or several desired properties of the geometry in question.

Such geometries may, for instance, be elongated structures such as a weld joint; a two-dimensional surface; or a complex 3D object. Common to all geometries relevant to the present inventions is that they are associated with a flat or curved surface along which the inspection takes place along one or two dimensions across the surface in question.

Methods for geometry inspection are known. For example, it is known to inspect a weld joint by moving a handheld device along the welded joint while allowing the handheld device to laser scan the geometry so as to create a virtual geometric shape profile of the weld joint along its length which can then manually or automatically be studied using digital methods. Such devices typically also capture image material depicting the weld joint as the handheld device in question is moved along the weld joint.

Such handheld devices may furthermore project a light pattern onto the surface of the inspected weld joint, to allow the user of such a handheld device to align the device in relation to the weld joint and then sweeping the handheld tool along the weld joint aided by the light pattern.

During such sweeping, an inspected geometry profile may be determined along the sweep, by simply adding a recently detected geometric profile across the weld joint, which added profile is taken perpendicular to the sweeping direction at the end of a total profile. However, sweeping velocity can vary unpredictably, and the sweeping may not be performed exactly along an intended sweeping trajectory. For instance, a user may vary the scanning angle during the sweeping.

One problem with known devices is hence to provide a reliable measurement, in a direction along a sweeping direction, of a particularly inspected geometry.

Another problem is to efficiently relate a particular sub-geometry to a coordinate system of the geometry as a whole.

Another problem is to allow a geometry inspection device to be moved as freely as possible across a surface of an inspected geometry while still being able to create a reliable data representation of a desired aspect of the geometry in question. In particular, it would be desirable to allow such a handheld tool to be moved relatively fast; with varying velocity; and across two perpendicular dimensions without adversely affecting the resulting data representation.

The present invention solves the above described problems.

Hence, the invention relates to a method for inspecting a geometry having a surface, which method uses an inspection device having a digital image capturing means and a shape scanning means, which method comprises the steps of a) orienting the inspection device in a first orientation in relation to the surface; b) depicting the surface using said image capturing means to produce a first image; c) measuring a shape of a first part of said geometry using said shape scanning means to produce a first shape; d) moving the inspection device to a second orientation in relation to the surface, which second orientation is not the same as the first orientation; e) depicting the surface using said image capturing means to produce a second image; f) measuring a second part of said geometry using said shape scanning means to produce a second shape; g) using digital image processing based on said first and second images, determining a geometric orientation difference between said first and second orientations; h) based on said geometric orientation difference, determining a geometric relation between the first and second shapes; and i) producing a data representation of said geometry based on said first shape, said second shape and said geometric relation.

Furthermore, the invention relates to an inspection device for inspecting a geometry having a surface, which inspection device comprises a computer device, a digital image capturing means and a shape scanning means, which inspection device is arranged to, when oriented in a first orientation in relation to the surface, depict the surface using said image capturing means to produce a first image and to measure a shape of a first part of said geometry using said shape scanning means to produce a first shape; wherein the inspection device is arranged to, when oriented in a second orientation in relation to the surface, which second orientation is not the same as the first orientation, depict the surface using said image capturing means to produce a second image and to measure a second part of said geometry using said shape scanning means to produce a second shape; which inspection device (100) is further arranged to, using said computer device, perform digital image processing based on said first and second images to determine a geometric orientation difference between said first and second orientations, to determine, based on said geometric orientation difference a geometric relation between the first and second shapes, and to produce a data representation of said geometry based on said first shape, said second shape and said geometric relation.

In the following, the invention will be described in detail, with reference to exemplifying embodiments of the invention and to the enclosed drawings, wherein.

Figure 5A:
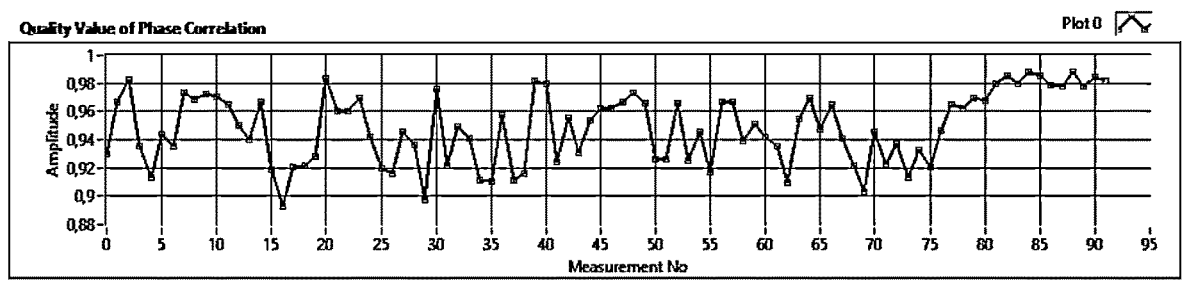
Figure 5B:
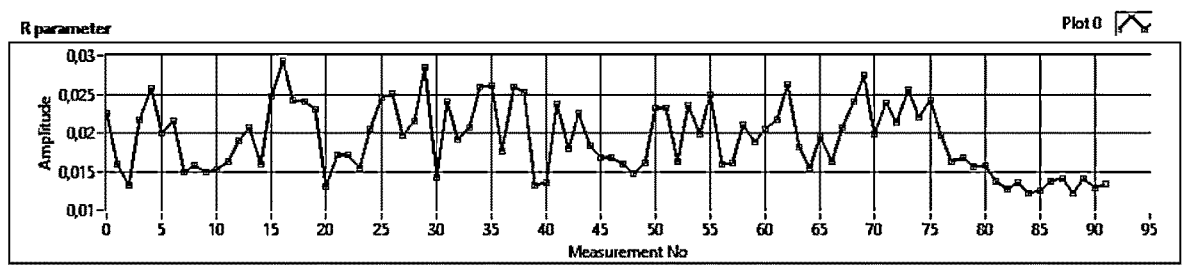
Figure 5C:
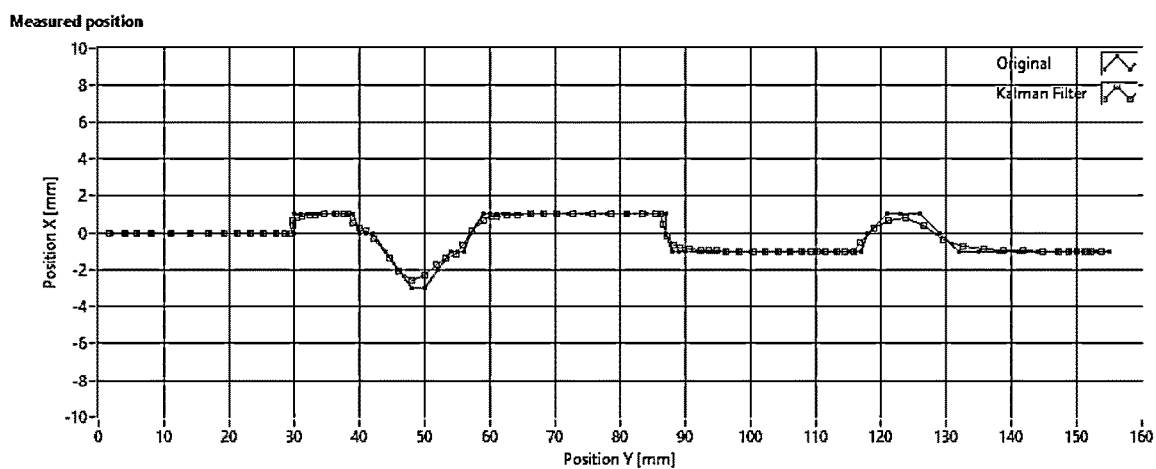

FIGS. 4*a*-4*k* illustrates the different method steps in an exemplary embodiment of a method according to the present invention;

FIGS. 5*a* and 5*b* show a correlation quality measure and a calculated Kalman filter input value, respectively, as a function of time; and FIG. 5*c* illustrates a corresponding estimated translation, with and without an applied Kalman filter.

Figure 1:
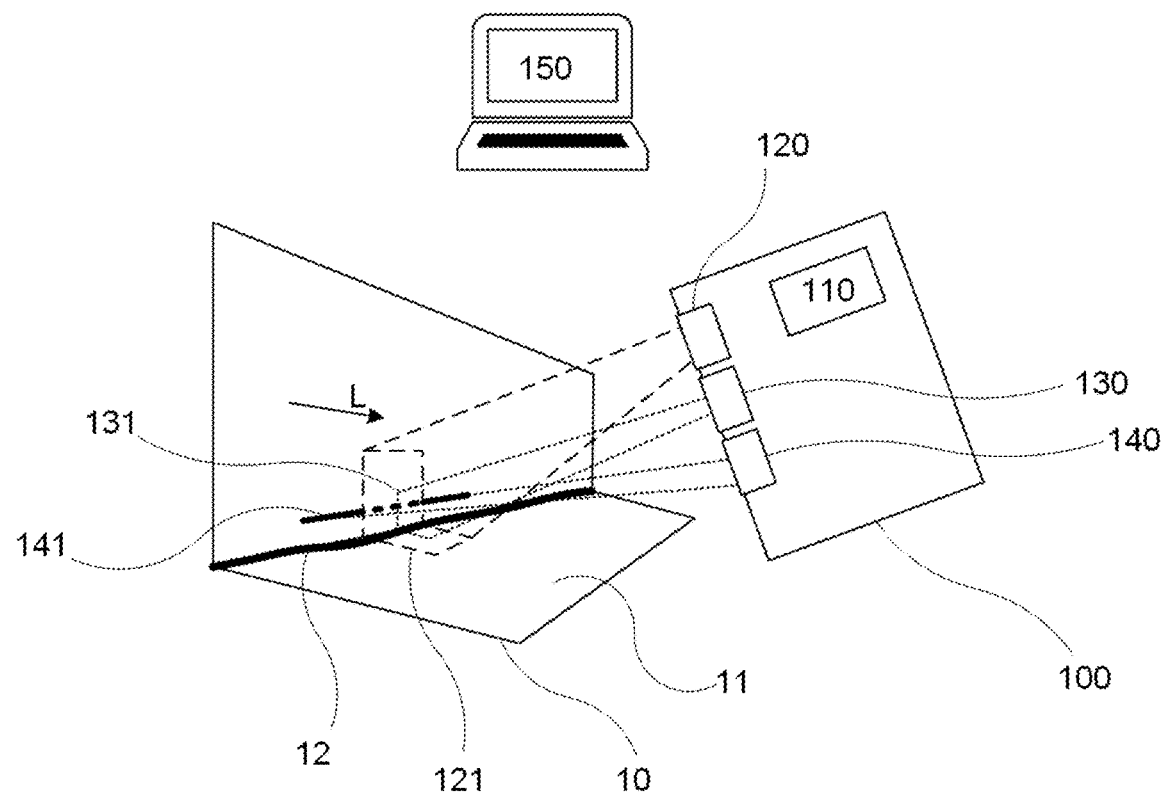
FIG. 1 illustrates an inspection device according to the invention, during use for inspecting a geometry.

FIG. 1 illustrates an inspection device 100 according to the invention, arranged for performing a method according to the present invention. The inspection device 100 may be connected, via a per se conventional digital wired or wireless interface, to a computer 150 having a screen arranged to present an interactive user interface, such as an interactive graphical user interface, to a user. Alternatively, the functionality described herein may be physically integrated into the inspection device 100, which in turn may be a handheld, mobile device.

The functionality described herein may be implemented purely in hardware, but it is preferred that the implementation is in a combination of purpose-specific hardware and purpose-specific software. Such software may execute at least partly on the device 100, and/or at least partly on the computer 150 and/or at least partly on a remote server or similar, which may be accessed via the internet and which is in communication with the device 100 and/or the computer 150.

The device 100 may preferably be handheld, and hence arranged with a handle or similar for allowing a human user to hold the device 100 and to move it across a surface 11 to be inspected. In other embodiments, the device 100 may comprise a fastening means for fastening the device 100 to a robot or similar machine in turn arranged to move the device 100 along a surface to be inspected. The device 100 may also be integrated into such a robot or similar machine. However, in certain embodiments the device 100 is only arranged for manual operation, and will then provide the below-described advantages as a human user moves the device 100 manually along a surface to be inspected.

The inspection device 100 is specifically arranged for inspecting a geometry 10 having a surface 11. The geometry 10 may be or belong to any object to be inspected with respect to its geometric properties. Such geometric properties are defined by said surface 11 of the geometry 10, which may be a generally flat surface or have any type of surface structure and/or general curvature or shape. The surface 11 should have some type of visible pattern and/or structure making it possible to visually discern a movement of a visual image capturing camera in relation to the surface 11 between two captured images.

The example shown in FIG. 1 is a geometry 10 in the form of a welded metal detail, the surface of which is then the metal surface of the detail, including the surface of the weld joint. It is however realized that any geometry having a well-defined surface may be inspected using an inspection device 100 and a method according to the present invention. Typically, the inspection comprises the determination of a shape and/or structure of the said surface by the device 100, while keeping track of a current position along the surface of the device 100 using digital image processing as described hereinbelow. For instance, objects useful for inspection using a device 100 and a method according to the present invention, apart from welded details and in particular weld joints, are processed wood products; machined metal parts; plastic, glass, stone and composite material surfaces; parts made using additive production methods; and a wide spectrum of other types of objects and materials.

The inspection device 100 comprises a digital image capturing means 120, such as a digital camera, arranged to capture light incident from the surface 11 and to store this light in the form of a digitally stored pixmap image. The means 120 is hence arranged to capture an image of the geometry 10 surface 11 in front of the inspection device 100 when the device 100 is oriented with the means 120 facing the surface 11.

The digital image capturing means 120 preferably has a resolution of at least 100×100 pixels, such as at least 200×200 pixels, or even at least 1,000×1,000 pixels, and may be able to produce a digitally stored image containing image information in one single channel (grayscale image) or several channels (such as an RGB image). The means 120 may also, or instead, comprise image information in channels for non-visible light, such as infrared light. This all depends on the circumstances.

In general, the image material captured by the means 120 is used to track the movement of the device 100 in relation to the surface, why it is important that the means 120 is capable of capturing image information which has sufficient structure to be able to detect a difference in two images captured at two different locations along the surface and to determine a relative image translation along the surface based on the informational content in said images. Therefore, the suitable type of light captured and recorded by the digital image capturing means 120 may depend on the type of surface 11 analysed.

The digital image capturing means 120 may be arranged to capture with a frequency which is at least 10 Hz, preferably at least 20 Hz. Capturing frequencies ranging up to about 100 Hz, or at least up to 60 Hz, have proven useful. Depending on application, even higher capturing frequencies than 100 Hz may be useful to be able to allow the device 100 to be moved at high speeds across the surface 11.

The inspection device 100 furthermore comprises a shape scanning means 130, arranged to detect a shape of the surface 11 of the inspected geometry 10. Preferably, the shape scanning means 130 is arranged to scan and digitally store said shape in a two-dimensional plane which runs through both the shape scanning means 130 and the surface 11. The two-dimensional plane may furthermore be perpendicular or at least substantially perpendicular to a main direction of movement of the inspection device 100 along the surface 11. In FIG. 1, this main direction is exemplified by a main elongation direction L of the weld joint 12.

Preferably, the shape scanning means 130 is not arranged to capture a visual image of the surface, but instead only capture a physical geometric local shape of the surface 11. For instance, this may be achieved by a laser scanner, for instance a LIDAR type device.

Specifically, the shape scanning means 130 is arranged to detect a respective surface 11 section shape 131 at the particular location on the surface 11 observed by the means 130 at a current orientation of the device 100 in relation to the geometry 10. The shape 131 may be taken along a straight line across the surface 11. As the device 100 is moved along the surface 11, a number of such section shapes 131 are detected and stored, together forming a description of the shape of the surface 11 along the path taken by the inspection device 100 when moved along the surface 11.

The digital shape scanning means 130 may be arranged to measure a shape of the surface 11 at a current orientation of the inspection device 100 with a frequency which is at least 10 Hz, preferably at least 50 Hz, preferably at least 100 Hz. Scanning frequencies of up to about 200 Hz, or at least up to 150 Hz, have proven useful for material inspection purposes. For detection of very fine-granular structural features of the geometry 10, scanning frequencies even above 200 Hz may be useful.

As the term is used herein, the "orientation" of an object means both a location orientation and an angular orientation of the object in question.

As will be described in closer detail below, the shape measurement frequency of the digital shape scanning means 130 may be different from, and in particular larger than, such as at least 2 times or even at least 5 time larger than, the image capturing frequency of the image capturing means 120.

The digital shape scanning means 130 may be a per se conventional laser scanning means, arranged to measure a shape along a predetermined line (such as perpendicular to an intended device 100 movement direction) using a time-measurement of laser light emitted from the means 130 and reflected from the measured surface 11. Such laser-based shape measuring devices are well-known in the art, and will not be described in further detail herein.

The inspection device 100 may furthermore comprise a light source 140, arranged to project a guide light 141 of predetermined wavelengths. The guide light 141 is useful for guiding a user of the inspection device 100 when moving the device 100 across the surface 11. For instance, the guide light 141 may comprise a lit line which is parallel to and/or perpendicular to an intended movement direction of the device 100 when inspecting an elongated geometric feature of the geometry 10. In the example illustrated in FIG. 1, the guide light 141 comprises a line which the user is supposed to align with the weld joint 12 during inspection thereof.

The inspection device 100 may also comprise a control unit 110, which is connected for communication with the means 120, 130, 140 and also with the computer 150, as the case may be. As indicated above, the control unit 110 may also be partly or wholly physically implemented in the computer 150 and/or as a remote internet cloud computation service or similar. The control unit 110 performs all the calculations and determinations described herein, if nothing is said to the contrary. The control unit 110 may typically be a computer device, comprising at least one CPU, at least one digital RAM memory and at least one communication bus.

Figure 2:
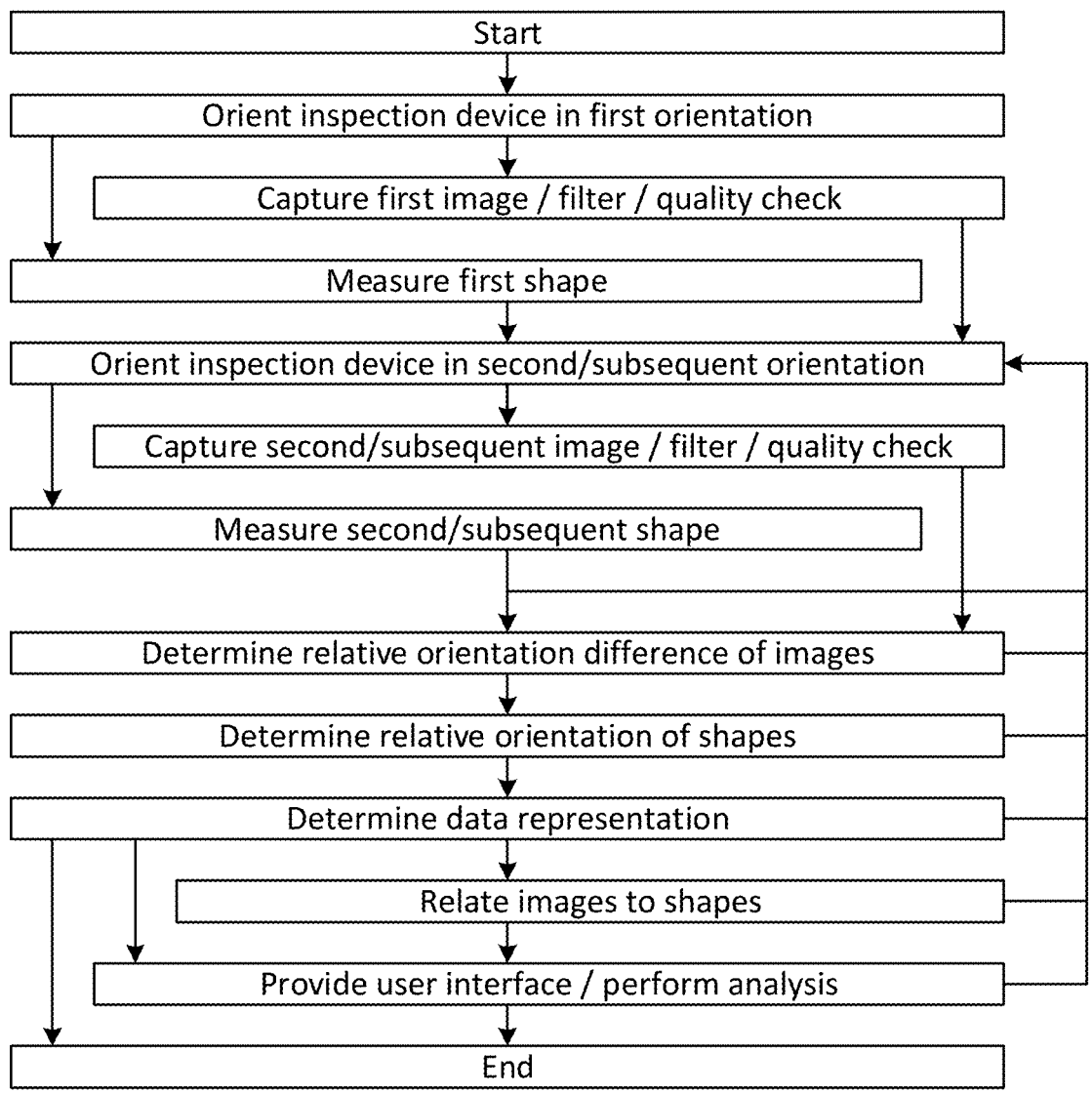
FIG. 2 is a flowchart illustrating a method according to the present invention.

FIG. 2 illustrates a method according to the present invention.

In a first step, the method starts.

In a subsequent first orientation step, the inspection device 100 is oriented in a first orientation in relation to the surface 11. In this first orientation, as is the case for the below described second and subsequent orientations, the image capturing means 120 and the shape scanning means 130 are oriented so that they can perform an image capturing and a shape measuring of a certain part of the geometry 10.

It is preferred that the image capturing means 120 and the shape scanning means 130 are directed so that the shape measured by the shape scanning means 130 lies at least partly within the image depicted by the image capturing means 120 in case these two means 120, 130 are activated for capturing/measuring at the same time.

In particular, it is preferred that the image capturing means 120 and the shape scanning means 130 are fixed in relation to each other in the inspection device 100 in the sense that a measured shape is always located at the same or at least substantially the same position in relation to the part of the surface 11 being depicted when means 120, 130 are activated at the same time. Preferably, the image capturing means 120 and the shape scanning means 130 are rigidly and fixedly connected one to the other using appropriate hardware of the device 100.

The orientation of the inspection device 100 in the first orientation step may be a part of an ongoing, such as continuous, movement of the device along the surface 11 to be inspected. Hence, there is really no reason for the inspection device 100 to come to a standstill in the first orientation, it may rather just pass this first orientation on its way along its inspection path.

In a subsequent first image capturing step, the surface 11 is depicted using the image capturing means 120, to produce a first digitally stored image of a first part of the surface 11. The first image capturing step may comprise an automatic image quality checking step, which may comprise a parameter-based automatic evaluation of the quality of the image. For instance, if the image is out-of-focus or blurred in any other way, this may be determined using standard digital image processing techniques and the first image may be discarded. In practise, the sharpness of the captured image may be quantified, such as using a frequency analysis, and compared to a predetermined value, and the image may be discarded if the sharpness is below said predetermined value. In case the image is discarded, another image is captured and used as the first image if it passes the quality check.

In a first shape measuring step, which may be performed before or after the first image capturing step, a shape of the first part of the geometry 10 is measured, using the said shape scanning means 130, to produce a first digitally stored shape of the surface 11.

It is realized that the first image capturing step and the first shape measuring step may be performed at the same time or one after the other in any order. In the second case, the first image capturing step and the first shape measuring step will generally not be performed when the inspection device 100 is in the exact same position. This, however, is generally not be necessary, since the trajectory along the surface 11 performed by the inspection device 100 as estimated by the control unit 110 based on a series of images captured by the device 100 as described herein below can be used, via interpolation, to determine a current location along said trajectory for any time between the capturing of such images. Hence, in an example in which the first shape is measured between two consecutively captured images, the location along said trajectory can be determined for the measurement time of the shape in question, and the location of the measured shape on the surface 11 hence determined.

In a subsequent second orientation step, the inspection device 100 is moved to a second orientation in relation to the surface 11, which second orientation is not the same as said first orientation. Typically, the second orientation is one in which the device 100 has moved some ways further along its trajectory along the surface 11 along which the inspection is performed.

Generally, it is preferred that the inspection device 100 is moved in a translational manner along the surface, at a roughly equidistant manner in relation to the surface 11. If the surface 11 itself is curvilinear on a scale of the same order of magnitude as the inspection device 100 or higher, it is preferred that the motion of the inspection device 100 is arranged so that the inspection device 100 at all times is held at a substantially perpendicular, substantially constant, distance to a general surface 11 angle at the location for the currently depicted image. However, using the present invention this is not strictly necessary, as will become apparent from the below.

In a second image capturing step, which is subsequent to the first image capturing step, the surface 11 is again depicted using the image capturing means 120, to produce a second image. This second image will generally not depict the exact same area of the surface as depicted by the first image. However, it is preferred that the first and second images have an overlap. This overlap is preferably at least 25%, preferably at least 50%, preferably at least 75%, of a total image width in the longitudinal direction L. The second image capturing step may also comprise an automatic image quality checking step which may be similar to the one described above in relation to the first image capturing step.

In a second shape measuring step, which is subsequent to the first shape measuring step, a second part of the geometry 10 is measured, again using the shape scanning means 130 to produce a second shape of the surface 11.

Again, the second image capturing step and the second shape measuring step may be performed simultaneously or one after the other, in a way corresponding to the relation between the first image capturing step and the first shape measuring step described above.

In a subsequent image processing step, the control unit 110 determines, using digital image processing based on said first and second images, a geometric orientation difference between said first and second orientations. This geometric orientation difference is a difference in terms of the relative orientation of the inspection device 100 to the surface 11 in a way allowing the control unit 110 to unambiguously determine a location along the surface 11 of a particular shape measured by shape measuring means 130 at a particular measurement time. The orientation difference can hence be thought of as a movement distance along the above-mentioned inspection trajectory of the device 100. As noted above, the control unit 110 may use interpolation to determine an estimated inspection device 100 orientation at times between image captures. In particular, the first and second Fourier transformed images may be 2D cross-correlated as described below, and the best fit of the cross-correlation may then result in the image displacement both in X and Y direction.

In a subsequent shape processing step, the control unit 110 determines, based on said determined geometric orientation difference, a geometric relation between the first and second measured shapes. In particular, the geometric relation is determined to allow the control unit 110 to, based thereon, determine the relative geometric orientation of the first and second shapes to construct a virtual, digitally defined and stored, model of the surface across which the inspection device 100 was moved along said inspection trajectory.

In a subsequent data representation step, the control unit 110 determines a data representation of the geometry 10, and in particular of its shape 11, based on the first shape, the second shape and the geometric relation determined between them in said shape processing step. The data representation may, for instance, be in the form of a virtual model of the surface 11 along the inspection trajectory swept by the device 100.

In a subsequent step, the method ends.

Using such a method and such a device 100, it is possible to very easily and quickly, however still reliably, inspect a geometry 10 by a human user simply sweeping the device 100 along an inspection trajectory (such as along a weld joint 12) in relation to the geometry 10, and as a result automatically achieve a digital data representation of the geometry along said trajectory. It is important to note that this produced data representation will in general be to scale, since the coordinate in the longitudinal direction L along said trajectory is determined to a selected precision based on the captured images with a selected on surface 11 pixel size. At the same time, the captured images can be mapped to the data representation of the surface 11 shape, via said determined longitudinal direction L coordinates, for subsequent use in various ways (such as for maintenance evaluation or production quality assessment).

It is also noted that this is possible without any additional means for measuring the orientation of the device 100 along the inspection trajectory during inspection, and in particular that the device 100 may be arranged not to use any distance wheel rolling along the surface 11, or similar. In fact, it is preferred that the device 100 lacks any parts that are arranged to make direct physical contact with the geometry 10 and its surface 11 during the device 100 being moved along the surface 11.

Furthermore, even if the device 100 may comprise one or several gyroscopes and/or one or several accelerometers to keep track of a movement of the device 100 during inspection along the inspection trajectory, it is preferred that the device 100 does not comprise such functionality. It has turned out that adequate results can be achieve even without such gyros or accelerometers.

As mentioned, the method may furthermore comprise geometrically relating the first image and the second and any subsequently captured image to the determined data representation. Then, in a subsequent step, the method may comprise presenting to a user a user interface, such as an interactive and/or graphical user interface, such as on a screen of the computer 150 and/or directly on the mobile device 100, using which interface a user can select a particular part of the inspected geometry 10 and as a result thereof be presented with both a representation of said geometry 10 part and also with image material visually depicting the geometry 10 part in question. Such interface may present the user with a conventional interactive 3D model exploration interface, allowing the user to explore the 3D model specified by said data representation, or a more purpose-tailored interface.

In particular, the control unit 110, such as in the form of computer 150, may execute software that automatically analyses the data representation for predetermined parameters, such as parameters indicating flaws or damage, and highlights such points of interest to the user in said graphical user interface. Alternatively, the data representation may be constructed in realtime or near realtime during the movement of the inspection device 100, and a parameter analysis may then be performed immediately and the user may be alerted by the control unit 110 directly when a possible flaw or damage is detected by the sweeping device 100. Such an alert may, for instance, be in the form of a sound signal or a light signal.

For the particular example of a weld joint 12, relevant such parameters may be cross-sectional width of the weld joint 12 part of the geometry 10, or variability along the elongation direction L of this cross-sectional width.

Hence, the above discussed geometric relating and user interface provision may take place after an inspection sweep has been finalized, or even be dynamically updated and provided to the user during the ongoing sweep, using the data which has been made available to the control unit 110 up until that point in time.

In some embodiments, and as mentioned above, the measuring in said first and second shape measuring steps may comprise a laser-based distance measurement of a distance from the shape scanning means 130, and in particular of a distance between the inspection device 100 and the surface 11. It is, however, realized that the shape scanning means 130 also may use other touchless distance measuring techniques than laser based such techniques, such as an acoustically based distance measurement.

In any of these cases, the determination of the relative geometric orientation difference in the image processing step may be performed based on such a measured distance from the device 100 to the surface 11. In case an image is captured between two measured distances, interpolation may be used in a way corresponding to what has been described above in relation to shape detection.

In particular, a current distance from the inspection device 100 to the surface may be calculated by performing the following ordered steps:

Optionally controlling the measured shape for basic measurement validity, for instance that the number of data points available exceed a predetermined minimum number, and that the measurement variance is not higher than a predetermined threshold.

Optionally filtering measurement distance data forming a dataset representing a measured shape, to minimize the effect of measurement noise. Such a filter may be a filter designed to remove spikes in the measured shape.

Optionally selecting a subrange of the measured shape, such as a subrange observed in a predetermined part of a viewport of the image capturing means 120, such as a predetermined central part of said viewport.

Calculating a current distance as a means distance between each measured point along the shape and the inspection device 100.

Figure 3:
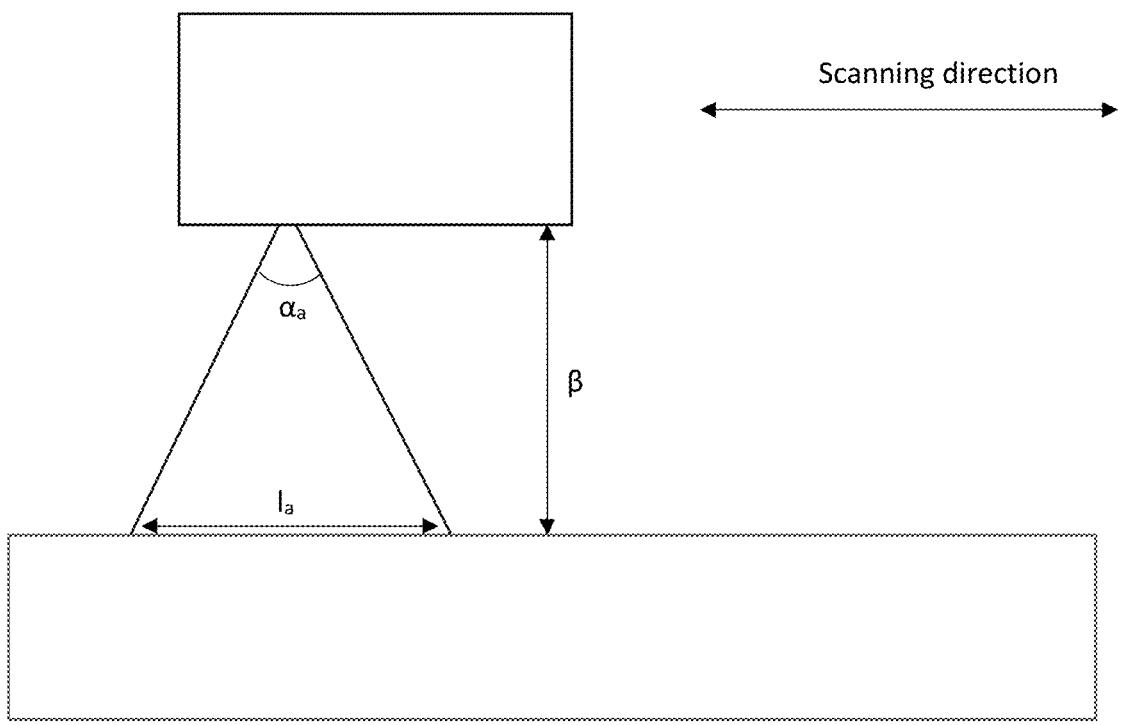
FIG. 3 illustrates a way of calculating an on-surface image pixel width.

Then, said relative geometric orientation difference can be calculated based on the last measured such current distance, and further based on the angle of view of each pixel in the captured image, to determine a relative geometric orientation difference between two compared images in terms of physical distance across the surface 11 of the inspected geometry 10. For instance, if the angle of view for each pixel is known to be $\alpha$ and the distance between the surface 11 and the means 120 is known to be $\beta$, the width $\gamma$ of each pixel in the captured image (on the projected surface) can be calculated as follows (see FIG. 3):

$$l_a = 2 * \beta * \tan\frac{\alpha_a}{2}$$

where $l_a$ is the total width, in a direction a, of the captured image as projected onto the surface 11 and where $\alpha_a$ is the total angle of view, in said direction a, for the image. Furthermore:

$$\gamma_a = \frac{l_a}{R_a}$$

where $R_a$ is the image resolution in direction a and $\gamma_a$ is the length of each pixel on the projected surface 11 in said direction a, as explained above.

Once it is determined by how many pixels the captured images differ in terms of translation across the surface 11, the total distance across the surface 11 can be calculated as total pixels times $\gamma$.

In particular, the determining of said relative geometric orientation difference may comprise calculating a maximum value for a correlation between said first and second images when varying a translational relative position of the images in question and calculating such a correlation for a plurality of different such translational relative positions. Hence, the first and second images are translated in relation to each other into a plurality of different relative image positions, and the correlation between the images is calculated for each such position on a per pixel intensity level basis. Then, the relative geometric orientation difference is determined as the relative translation yielding the highest correlation. The translation may be in both image X and Y directions, why the relative geometric orientation difference may be expressed in terms of both X and Y image direction (and hence in two dimensions with respect to the device 100 to which the image capturing means 120 is fixed).

Moreover, said correlation may preferably be calculated for the images in the frequency domain, using a respective Fourier transformation of each of said first and second images. This is denoted a "phase correlation" calculation. In practise, each of said first and second images may be Fourier transformed and their cross-correlation spectral density may be calculated and possibly normalized, and then inverse Fourier transformed to achieve a matrix representation of the cross-correlations for different X and Y translations of time images. Then, the maximum correlation relative translation may be determined as based on the maximum value of the resulting matrix in question.

For instance, given first and second captured images a and b, their respective Fourier transform can be calculated as $G_a$ and $G_b$, for instance using a conventional fast Fourier transform algorithm. Before this Fourier transform, the images may be converted to grayscale if the image capturing means 120 is arranged to capture colour images.

Thereafter, the cross-power spectrum of $G_a$ and $G_b$ can be calculated by taking the complex conjugate of the second Fourier transformed image, the Fourier transformed images may be multiplied together element-wise, and the product may be normalized element-wise:

$$R = \frac{G_a \circ G_b^*}{|G_a \circ G_b^*|}$$

where "∘" is the Hadamard product (entry-wise product), and the absolute values are taken entry-wise as well. Written out entry-wise for each element index (j,k):

$$R_{jk} = \frac{G_{a,jk} \cdot G_{b,jk}^*}{|G_{a,jk} \cdot G_{b,jk}^*|}$$

Thereafter, the normalized cross-correlation is obtained by applying the inverse Fourier transform:

$$r = \mathcal{F}^{-1}\{R\}$$

Finally, the location of the correlation peak in first image coordinates (x,y) is determined as:

$$(\Delta x, \Delta y) = \underset{(x,y)}{\operatorname{argmax}}\{r\}$$

A quality value of the cross-correlation may then be calculated by dividing the maximum cross-correlation value by the average cross-correlation value found, and the relative geometric orientation difference may then be considered validly determined only if the quality value is higher than a predetermined threshold (which may be determined empirically depending on concrete circumstances).

In some embodiments, the first and second captured images may be transformed into a log-polar coordinate system prior to performing such a correlation determining of the relative image translation. Namely, a determined relative translation in the log-radial direction then corresponds to a relative scaling between the first and second images, and a determined relative translation in the angular direction then corresponds to a relative turning between the first and second images. Then, the first and second images may be rescaled and/or turned in relation to each other based on said log-polar correlation calculations, as the case may be, and the above-described correlation calculations to find a relative translation may then be performed on the thus transformed images. This way, the inspection device 100 may be turned and/or brought closer to or further from the surface 11 between consecutive image captured and the method may still be able to correctly determine a translation of the device 100 relative to the surface 11 based on the digital image processing performed on the first and second images.

Generally put, the correlation calculations performed according to the present invention may at least partly be performed in a log-polar coordinate system. One correlation may be performed in the log-polar coordinate system, in order to estimate rotation and/or scaling, and an additional correlation may be performed in Euclidian coordinates, to determine X and Y translation.

As shown in FIG. 2, the method may furthermore be performed iteratively whereby the steps from the second orienting step up to and including the shape processing step are iterated using third and subsequent orientations of the device 100 in relation to the surface 11, whereby third and subsequent images and shapes are produced. Hence, in each such iteration the inspection device 100 is moved to a new orientation, such as along the weld joint 12 in the longitudinal direction L; a new image is produced by the image capturing means; a new shape is measured by the shape scanning means 130; the relative orientation difference is determined between consecutive images; and the relative orientation of shapes is determined.

It is explicitly pointed out that such an iterative process may comprise additional instances of device 100 reorientation, image capturing and/or shape scanning performed in between such iterations. For instance, the reorientation may be a part of a continuous movement without any full stops; and the shape scanning may be performed more frequently than the image capture during the continuous movement in question.

As is illustrated in FIG. 2, the reiteration back to the orientation step can be performed from a number of different later steps, depending on the concrete embodiment and possibly also due to a dynamic adaptation to particular circumstances.

The method may be iterated until a user actively ends the inspection, for a predetermined period or inspection distance; until the control unit 110 automatically detects a stop signal such as the user bringing the device 100 to a standstill; or until any one of a predetermined number of predetermined conditions of these and other types are fulfilled.

As a part of the image processing step, a quality value of the phase-correlation (herein denoted "PCQ value") may be calculated by dividing a maximum found cross-correlation value (for a particular combination of X and Y relative image offset, used to determine actual translation) by an average cross-correlation value (for all or at least a plurality of combinations of X and Y). Then, if the PCQ value is found to be below a certain threshold, such as a predetermined value, the correlation may be deemed not reliable, and the method may reiterate back to capturing a new second image.

In particular for an iterative process, the determining in the above-described image processing step may comprise applying a Kalman filter, such as a Kalman filter designed to assume a predetermined translational movement direction (such as the longitudinal direction L) of the inspection device 100 across the surface 11. Preferably in this and other cases, the determination in said image processing step may be based on at least three different, preferably consecutive, produced images, such as the last three produced and quality check passed images at each iteration.

Hence, a Kalman filter may be used to filter the final measured displacement value, using said PCQ value as an input value to the Kalman filter, in the form of a filter-external assessment of measurement inaccuracy, noise or variance, for weighing the filtering effect. Then, the weighted output translation value from the Kalman filter is used as the determined translation between images. This may then be performed in both X and Y directions, using the same PCQ value for both X and Y directions.

In particular, an input parameter to the Kalman filter denoted the "R" parameter may be an externally provided measure of measurement variance, used by the Kalman filter to produce an output estimated translation in each step of the iterative process. This parameter R may then be or be calculated based on the PCQ parameter using a predetermined function, such as a linear or non-linear function, and then fed into the Kalman filter process as a variable input parameter for each analysed image.

In one example, the following predetermined linear function was used to calculate the R value for each image:

$$R = -0.18\ FSQ + 0.19, \text{ with limits } 0.01 \leq R \leq 0.1$$

FIG. 5a illustrates the variation of the FSQ parameter during a test inspection using a device according to the present invention, along a weld joint. FIG. 5b illustrates the corresponding R values fed into the Kalman filter. FIG. 5c illustrates the resulting translation estimation, in X and Y directions, and with and without Kalman filter.

In particular, when such a Kalman filter is used in such an iterative process, the image processing step may comprise applying the Kalman filter to determine an estimated measurement uncertainty of the geometric orientation difference for a particular produced image determined in the image processing step, in relation to a different produced image. Such an estimated measurement uncertainty is generally an output from the applied Kalman filter, as such filters generally output a covariance matrix representing covariances between variables. Then, the determination in the image processing step, of the relative orientation difference between different images, may be designed to take into consideration different produced images to different degree, and in particular based on said determined estimated measurement uncertainty for the particular produced image in question.

For instance, for each image captured by the image capture means 120, the image may be stored in a memory (such as by the control unit 110). Several, such as three or more, consecutively captured images will then together represent an approximation of the movement of the inspection device 100 across the surface 11. The most recently captured image may then be compared not only to the second most recently captured image, but also to the third most recently captured image, and so forth, as long as the compared-to image has at least a certain overlap with the most recently captured image. Then, an estimated measurement quality value, such as the above-described relative correlation value, may be used as a weighting factor when determining a movement vector, distance or velocity of the device 100 in relation to the surface 11, where a resulting such vector, distance or velocity of each compared image is weighted using (based on) its corresponding measurement quality value. In the preferred case in which the Kalman filter presupposes an image horizontal or vertical movement, it is understood that the detected movement of the device 100 in relation to the captured image will be a horizontal or vertical movement, respectively.

As mentioned above, the geometry 10 may preferably comprise an elongated geometric structure 12, and the moving of the inspection device 100 in relation to the geometry 10 performed in the second orientation step may comprise a translation movement of the inspection device 100 along said surface 11. Preferably, said moving is substantially a pure translation, at substantially constant height, over and across the surface 11. As illustrated in FIG. 1, the elongated geometric structure 12 may be a weld joint.

The elongated structure may have a substantially constant cross-section across the longitudinal direction L, such as is typically the case for a weld joint. At least, such cross-section may vary within predeterminable bounds. In this case, the measured shapes can be automatically analysed by the control unit 110 to determine a temporary translation or inclination of the device 100 in relation to the geometry 10 perpendicularly to the longitudinal direction L, based on the currently measured shape being offset from a neighbouring measured shape. Then, the data representation can automatically be produced with the currently measured shape being offset to correct for the temporary translation or inclination in question. Alternatively, a temporary translation which is perpendicular to the longitudinal direction L and which is detected by the image correlation can be used to the same end, to correct a currently measured shape.

As mentioned above, a projected guide light 141 may be projected by the inspection device 100 light source 140 onto the surface 11, and be used to guide the movement imparted by a user to the device 100 across the surface 11. This will typically result in that at least one of the above mentioned first and second (and subsequently captured) images will cover an area of the surface 11 comprising at least part of said guide light 141 as reflected by the geometry 10. This situation is illustrated in FIG. 1.

However, since the light source 140 as well as the image capturing means 120 are both fixedly arranged to the movable device 100, when the user moves the device 100 across the surface 11, the relative location of the guide light 141 in the series of captured images will in general be the same or at least substantially the same, deteriorating the reliability of the correlation-based image analysis for performing the location of the device 100 in relation to the surface. Therefore, the depicting in the first, second and any subsequent image capturing steps may comprise a filtering sub step.

The projected guide light 141 may preferably be achieved by the light source 140 emitting the guide light 141 using predetermined wavelengths, such as a guide light of a known colour. Then, the filtering sub step may be designed to dampen said predetermined wavelengths. This way, the captured image may depict the guide light 141 in a way which is less intensive than a true depiction of the actual visual scene on the surface 11 covered by the image would show. Preferably, the guide light 141 is of wavelengths substantially not being emitted from the depicted part of the surface 11 at all, in which case the image used for said image processing step will substantially not show the guide light 141 at all. It is noted that the inspection device 100, such as the light source 140, may anyway provide illumination of the depicted surface 11, as long as such illumination does not produce wavelengths that are dampened or filtered away in said filtering sub step.

As used in this context, the term "filter" is intended to be interpreted broadly, in the sense that the effect of the said guide light 141 occurring within the viewport of the image depiction means 120 is reduced in intensity using a temporal, mechanical and/or digital filtering mechanism.

For instance, the filtering sub step may be implemented by ahead of time applying a physical light filter belonging to the image depicting means. For instance, a foil being transparent for all wavelengths apart from said predetermined wavelengths used for said guide light 141 may be arranged in front of the image capturing means 120.

Alternatively or additionally, the filtering sub step may implemented as a part of said digital image processing, actively reducing or eliminating said predetermined wavelengths in the captured image before performing said image processing on the image in question. It is noted that this technique works fine even in the case in which a colour image is captured and subsequently turned into a grayscale image format using digital image processing.

Alternatively, the filtering sub step may be a temporal filter, for instance implemented by only projecting the guide light 141 intermittently, so that the guide light 141 is not projected onto the surface 11 when a shutter (or similar) of the image depicting means 120 is open.

So far, the invention has been described in terms of a method. However, the present invention also relates to the inspection device 100 described above as such, which device 100 is specifically arranged for performing a method of the present type and in particular for inspecting the geometry 10 described above, which geometry 10 has a surface 11.

The inspection device 100 comprises a computer device, such as the above-described control unit 110, the digital image capturing means 120 and the shape scanning means 130.

The inspection device 100 is further arranged to, when oriented in said first orientation in relation to the surface 11, depict the surface 11 using the image capturing means 120 to produce said first image and to measure said first part of the geometry 10 using the shape scanning means 130 to produce said first shape.

Moreover, the inspection device 100 is arranged to, when oriented in said second orientation in relation to the surface 11, which second orientation is not the same as the first orientation, depict the surface 11 using the image capturing means 120 to produce said second image and to measure said second part of the geometry 10 using the shape scanning means 130 to produce said second shape.

The inspection device 100 is further arranged to, using said computer device, perform digital image processing based on said first and second images to determine a geometric orientation difference between said first and second orientations, to determine, based on said geometric orientation difference, a geometric relation between the first and second shapes, and to produce said data representation of the geometry 10 based on said first shape, said second shape and said geometric relation.

In some aspects, the invention also relates to a system comprising the inspection device 100 and the computer 150, including any software executing on these entities to perform the present method, and in particular such software executing on said control unit 110.

EXAMPLE

Figure 4A:
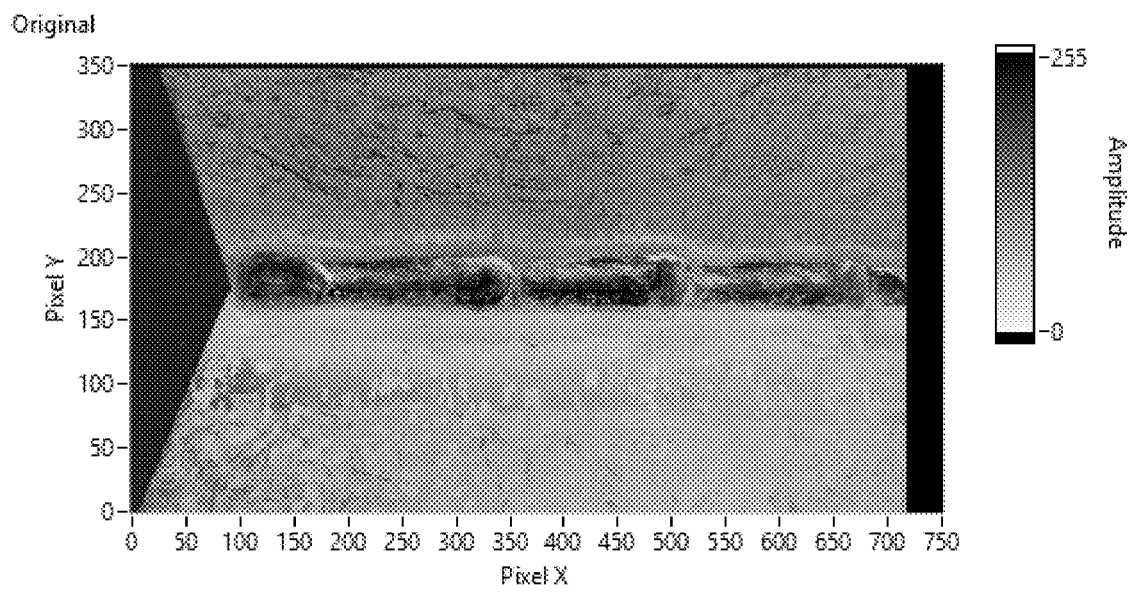

In an example, a handheld device of the above described type was moved across a metal surface comprising two metal plates and a weld joint connecting the two. Images were captured during the process. Since the images were colour images, they were first converted to grayscale. An example of such a grayscale-converted image is shown in FIG. 4*a*.

Figure 4B:
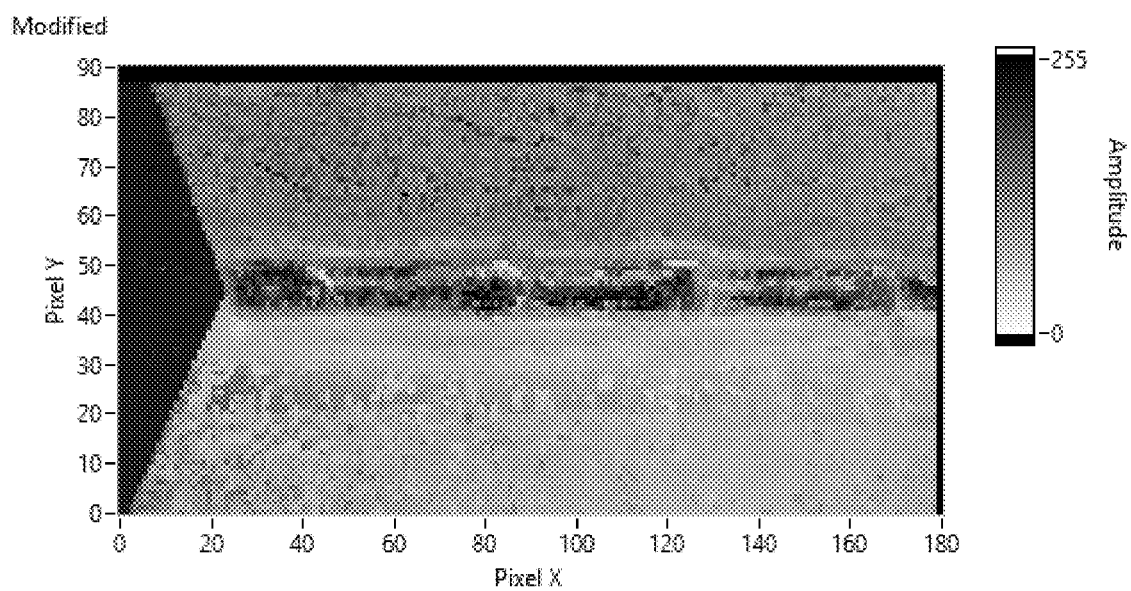
Figure 4C:
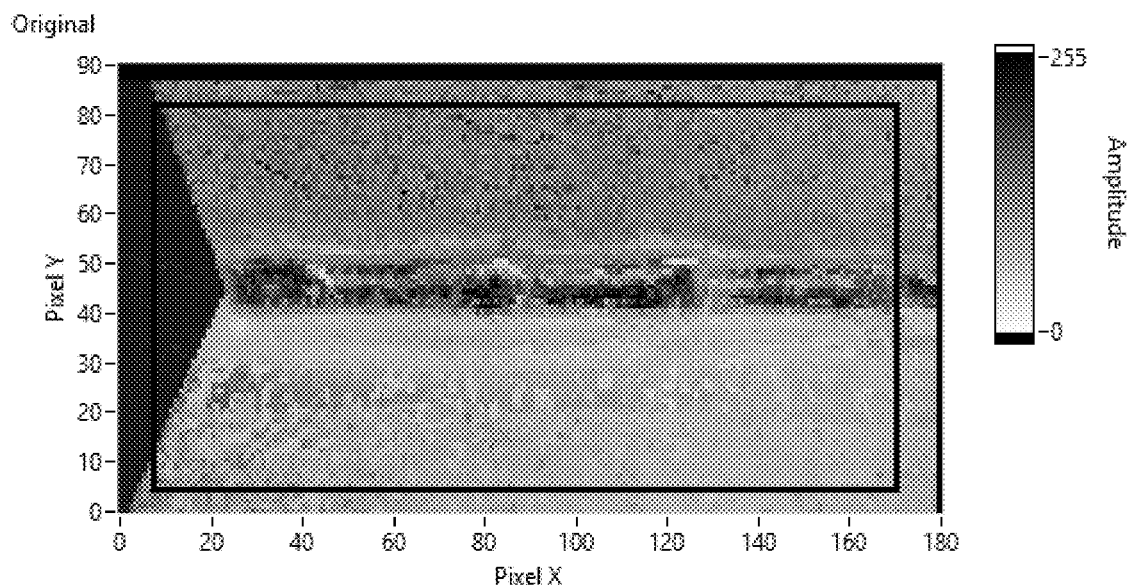
Figure 4D:
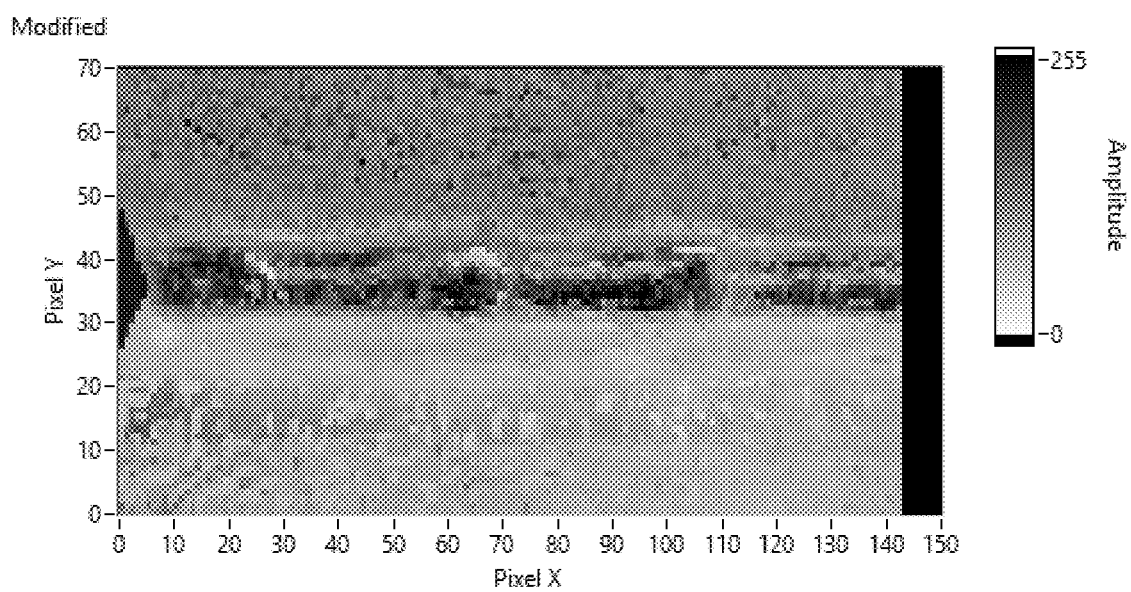

For each captured image, the pixel resolution was decreased, see example in FIG. 4*b*. Furthermore, about 10% of the edges of each image were cropped, see cropping rectangle in FIG. 4*c* and example result in FIG. 4*d*. In the present application, it is generally preferred to decrease the image pixel resolution before performing the correlation analysis, since smaller pixel resolution is typically required to achieve adequate correlation results than what is typically desired for viewing of the surface during inspection.

Thereafter, each image was Fourier transformed, and the Fourier transformed images were 2D cross-correlated pairwise in order of capturing time. The best fit of the cross-correlation results in the respective image displacement between pairwise compared images were determined both in X and Y image direction.

The following is pseudo code for performing the Fourier transformation and the correlation:

corr=fft.ifft2(multiply(frame1,conj(frame2))).real wherein
frame1 and frame2 are already expressed in frequency domain;
conj(frame2) calculates the complex conjugate for the second image, frame2;
multiply(frame1, conj(frame2)) multiplies the first image, frame1, and the complex conjugate of the second image, frame2, element by element; and
fft.ifft2(multiply(frame1, conj(frame2))).real calculates the inverse discrete Fourier transform using a Fast Fourier Transform algorithm, and returns the real part.

Then, the maximum-correlation translation in X and Y image direction is calculated according to the following:

max_y,max_x=unravel_index(argmax(corr, axis=None),corr_dims)

wherein
frame1 and frame2 are already expressed in frequency domain;
argmax(corr, axis=None) finds the coordinate values maximizing expression "corr"; and
unravel_index(argmax(corr, axis=None), corr_dims) translates the found maximizing coordinates to the correct Euclidian coordinate system.

Figure 4E:
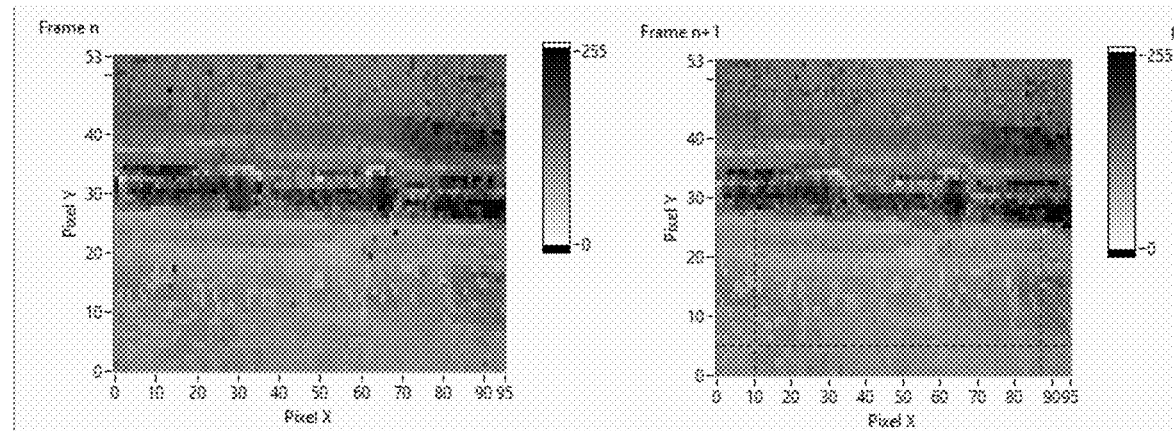

FIG. 4e illustrates a first image frame1 (left-hand part of FIG. 4e) as well as a subsequently captured second image fram2 (right-hand part of FIG. 4e).

Figure 4F:
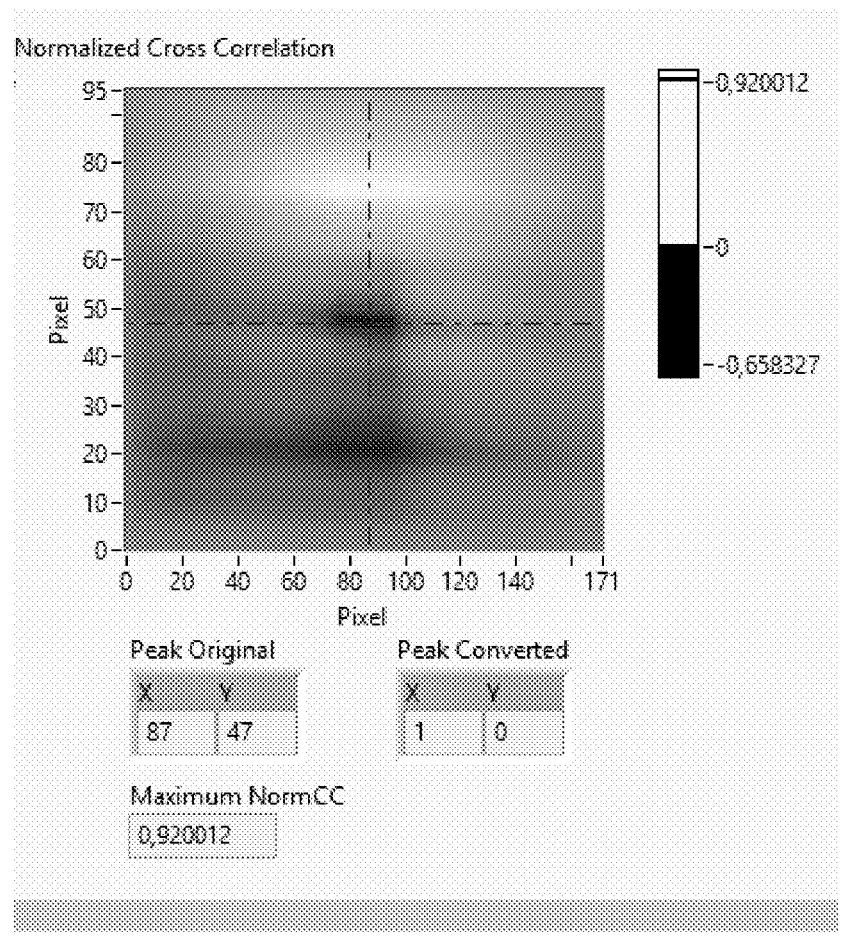

FIG. 4f illustrates a correlation map calculated between frame1 and frame2, wherein in each pixel in FIG. 4f corresponds to a particular relative translation between frame1 and frame 2 so that the pixel intensity for each such pixel represents a correlation between frame1 and frame2 at said particular relative translation. The cross-hairs show the point of maximum correlation found, finding that a translation between frame1 and frame2 corresponds to a positive 2 pixel X-direction translation.

Figure 4G:
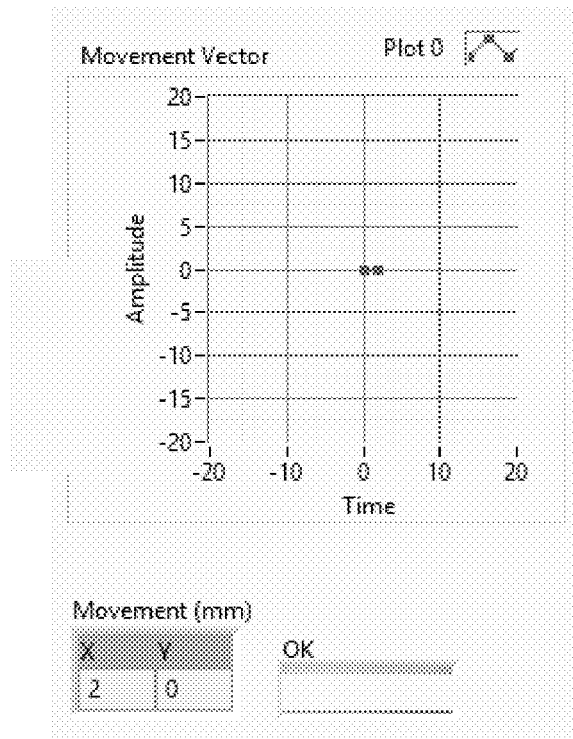

FIG. 4g illustrates, in a movement vector denoted in pixels (both X and Y axis), the determined translation of 2 pixels to the right found from the correlation shown in FIG. 4f.

Figure 4H:
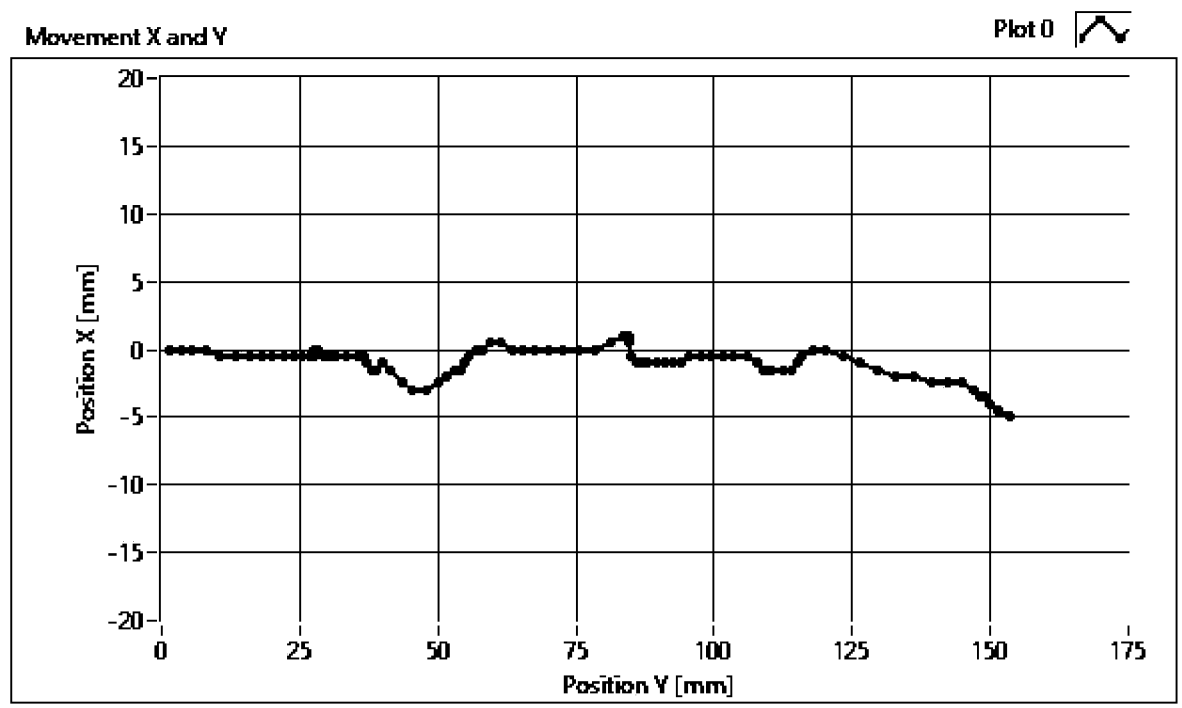

This process was iterated for consecutive images captured as the handheld device was moved along the inspected surface, each image being correlated to the immediately preceding image to determine an image-pixel denoted translation distance. The distance between the device and the surface was measured using a laser-based shape scanning means of the device as described above, and a mm-denoted translation of the device was calculated. The result is shown in FIG. 4h. As is clear from this FIG. 4h, both X-direction and Y-direction translations are correctly captured.

Figure 4I:
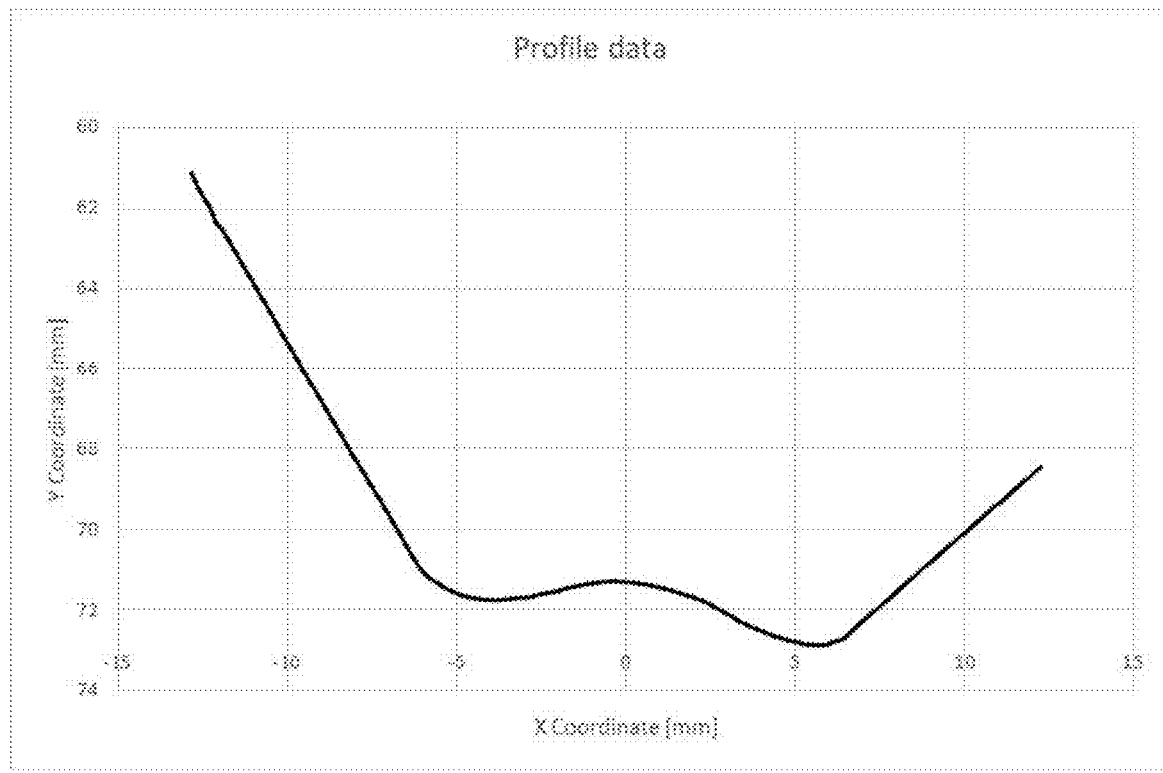
Figure 4J:
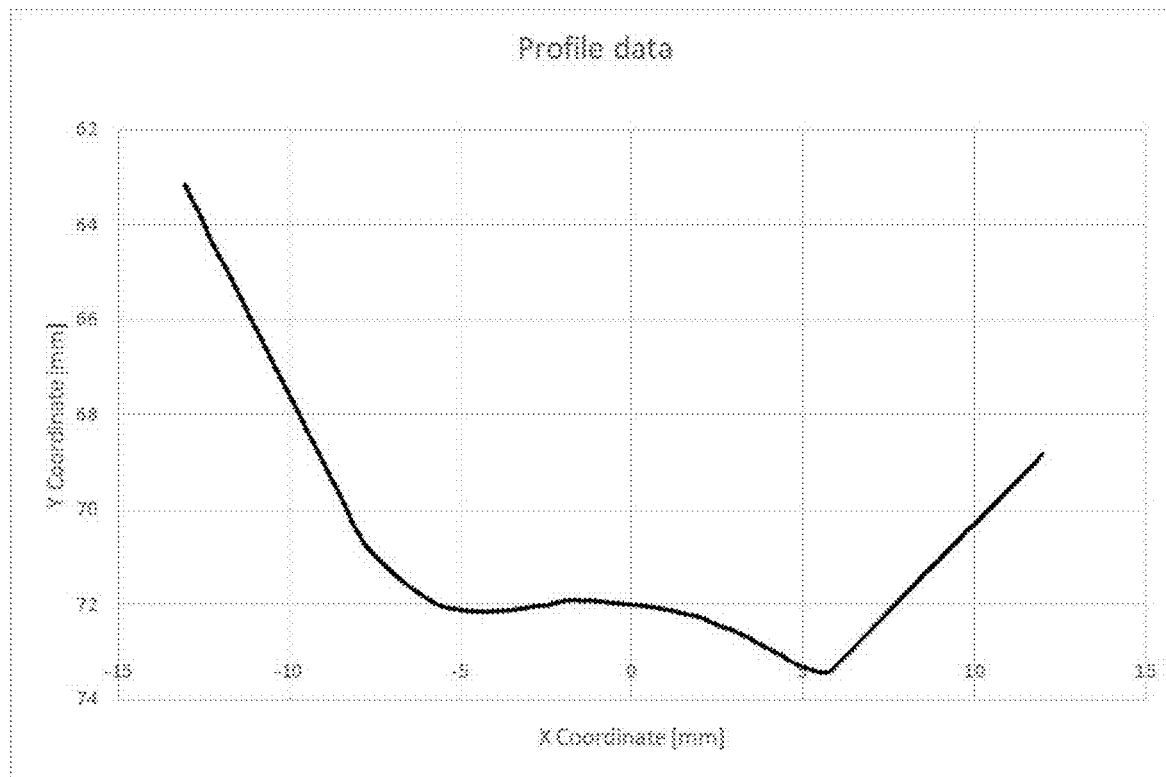

FIGS. 4i and 4j illustrates two different geometry surface shapes, taken along a respective line in the Y image direction of the image capturing means, scanned by the shape scanning means of the device at two different times (and as a result at two different locations along said surface).

Figure 4K:
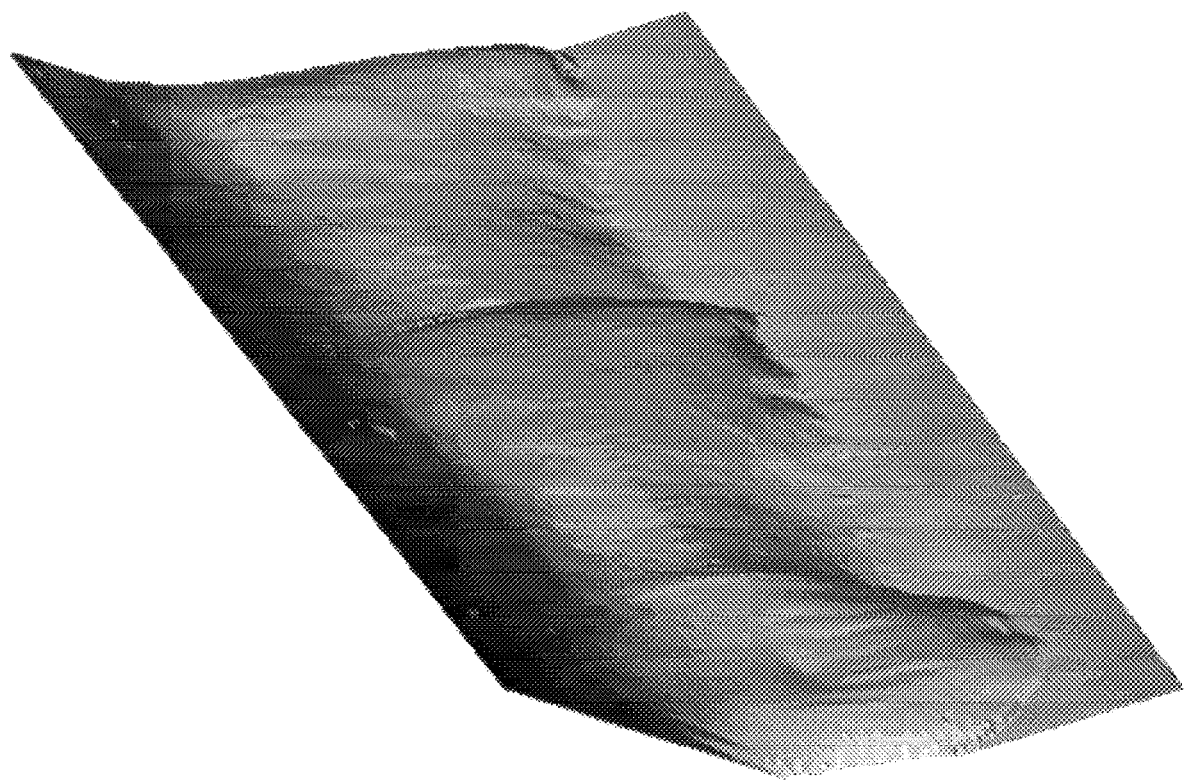

FIG. 4k illustrates a 3D rendering of a final data representation of the geometry surface shape as measured by the shape scanning means in the form of a plurality of scanned surface shapes that have been related to each other geometrically using the translation as a function of time determined based on the captured images. Such a 3D rendering can then be presented to the user in an interactive graphical user interface, such as with overlaid image material on the 3D shape, and/or be used as the basis for an automatic fault detection step performed by the control unit.

Above, preferred embodiments have been described. However, it is apparent to the skilled person that many modifications can be made to the disclosed embodiments without departing from the basic idea of the invention.

For instance, the captured images may be preprocessed in various ways before being used in the image processing step for determining the relative orientation difference. Such preprocessing may include the above-described grayscale conversion, as well as additional or alternative preprocessing steps, including down-sampling, using for instance a nearest-neighbour algorithm; and a cropping step, wherein the captured image may be cropped to a less extent in a detected or intended current movement direction of the device than in a perpendicular direction to such current movement direction. The current movement direction may, for instance, be detected based on correlation comparisons between previously captured images. Then, once the geometry structure has been determined and put into said data representation, the image material which is geometrically related to the data representation as described above may be the non-preprocessed raw captured images, or the captured images processed in other ways than for the determination of the relative orientation difference. In particular, the images used for the determination of the relative orientation difference (and hence to determine the translation of the inspection device 100 in relation to the geometry 10) may be down-sampled to a smaller pixel resolution than what is the case for the images subsequently related to the detected structure and presented to the user via said interface. In practise, it has turned out that lower pixel resolutions images may yield satisfactory results, in particular when performing the correlation comparisons across more than two images for each device movement, and due to the low pixel resolution lead to less CPU load. Typically, each image used for the determination of the relative orientation difference will contain fewer than a total of 100,000 pixels.

Above, the elongated inspection trajectory (weld joint 12) has been described as a straight line across the surface 11 of the geometry 10. However, the inspection trajectory may have arbitrary shapes, either by the device 100 being manually or automatically controlled to follow an elongated and curved structural feature of the geometry 10 or by the user for instance moving the device 100 arbitrarily across the surface 11 along a curvilinear path. In either way, the control device 110 may determine a curvature of the followed trajectory based on the above correlation of consecutively captured images. In particular, the mentioned log-polar-representation correlation between such images can be used to detect a rotation of the device 100 in relation to the surface and to update the trajectory's curvature based thereon. When producing the said data representation of the surface, this may take into consideration the inspection trajectory curvature so that the view of the inspected geometry represented by the data representation in question has an overall curvature corresponding to the thus measured inspection trajectory's curvature. In other words, the data representation may describe an elongated, overall meandering structure in turn defined by a series of cross-sectional profiles along said meandering structure.

It is understood that the device (100) itself may be designed in many different ways, and comprise additional functionality, as long as the principles delineated in the claims are observed.

Everything which is said herein regarding the method is equally applicable to the system, and vice versa.

Hence, the invention is not limited to the described embodiments, but can be varied within the scope of the enclosed claims.

The invention claimed is:

1. A method for inspecting a geometry (10), the geometry (10) being a weld joint having a surface (11), by using a handheld, mobile inspection device (100) having a digital image capturing means (120) and a shape scanning means (130), wherein the method comprises the steps of:
    a) freely orienting the inspection device (100) in a first orientation in relation to the surface (11) so that the inspection device (100) can perform an image capturing and a shape measuring of a certain part of the geometry (10);
    b) imaging the surface (11) using the digital image capturing means (120) to produce a first image;
    c) using the shape scanning means (130) to perform a laser-based distance measurement from the shape scanning means (130) to the surface (11) to measure a shape of a first part of the geometry (10) to produce a first shape, the shape scanning means (130) being separate from the digital image capturing means (120);
    d) freely moving the inspection device (100) to a second orientation in relation to the surface (11), wherein the second orientation is not the same as the first orientation, wherein the moving comprises a translation movement of the inspection device (100) along the surface (11) in a longitudinal direction (L) along a length of the geometry (10);
    e) imaging the surface (11) using the digital image capturing means (120) to produce a second image;
    f) using the shape scanning means (130) to perform a laser-based distance measurement from the shape scanning means (130) to the surface (11) to measure a second part of the geometry (10) to produce a second shape;
    g) determining, by using digital image processing based on the first and second images, a geometric orientation difference between the first and second orientations, wherein the determining comprises calculating a maximum value for a correlation between the first and second images when varying a translational relative position of the first and second images;
    h) based on the geometric orientation difference, determining a geometric relation between the first and second shapes; and
    i) producing a data representation of the geometry (10) based on the first shape, the second shape and the geometric relation,
    wherein the first shape is measured at a time between capturing the first and second images, and wherein a location of the first shape is determined by interpolating between the first and second images.

2. The method according to claim 1, wherein the method furthermore comprises geometrically relating the first image and the second image to the data representation and presenting to a user an interactive user interface which a user can use to select a particular part of the geometry (10) and as a result thereof be presented with both a representation of the particular part and also with image material visually depicting the particular part.

3. The method according to claim 1, wherein the correlation is performed in the frequency domain using a respective Fourier transformation of each of the first and second images.

4. The method according to claim 1, wherein the correlation is performed at least partly in a log-polar coordinate system.

5. The method according to claim 1, wherein the method is performed iteratively whereby steps d) to h) are iterated whereby third and subsequent images and shapes are produced.

6. The method according to claim 5, wherein the determining in step g) comprises applying a Kalman filter designed to assume a predetermined translational movement direction of the inspection device across the surface (11).

7. The method according to claim 6, wherein step g) comprises providing to the Kalman filter an estimated measurement quality of a determined geometric orientation difference for a particular produced image, and wherein the determination in step g) further takes into consideration different produced images to different degrees, in turn, based on a determined estimated measurement uncertainty for the particular produced image.

8. The method according to claim 5, wherein the determination in step g) is based on at least three different produced images.

9. The method according to claim 1, wherein the geometry (10) has a substantially constant cross-section across the longitudinal direction (L).

10. The method according to claim 1, wherein the inspection device (100) comprises a light source (140) arranged to project a guide light (141) of predetermined wavelengths useful for guiding a user of the inspection device (100) when moving the inspection device (100) across the surface (11), wherein at least one of the first and second images cover an area comprising at least part of the guide light (141) as reflected by the geometry (10), and wherein the imaging in steps b) and e) comprises a filtering sub step, wherein the filtering sub step is designed to dampen the predetermined wavelengths.

11. The method according to claim 10, wherein the filtering sub step is implemented using a physical light filter belonging to the digital image capturing means.

12. The method according to claim 10, wherein the filtering sub step is implemented as a part of the digital image processing.

13. A handheld, mobile inspection device (100) for inspecting a geometry (10), the geometry (10) being a weld joint having a surface (11), wherein the inspection device (100) comprises a computer device, a digital image capturing means (120) and a shape scanning means (130), the shape scanning means (130) being separate from the digital image capturing means (120), wherein the inspection device (100) is arranged to, when freely oriented in a first orientation in relation to the surface (11) so that the inspection device (100) can perform an image capturing and a shape measuring of a certain part of the geometry (10):
    image the surface (11) using the digital image capturing means (120) to produce a first image;
    use the shape scanning means (130) to perform a laser-based distance measurement from the shape scanning means (130) to the surface (11) to measure a shape of a first part of the geometry (10) to produce a first shape;

freely move the inspection device (100) to a second orientation in relation to the surface (11), wherein the second orientation is not the same as the first orientation, wherein the moving comprises a translation movement of the inspection device (100) along the surface (11) in a longitudinal direction (L) along a length of the geometry (10);

image the surface (11) using the digital image capturing means (120) to produce a second image;

use the shape scanning means (130) to perform a laser-based distance measurement from the shape scanning means (130) to the surface (11) to measure a second part of the geometry (10) to produce a second shape;

determine, by using digital image processing based on the first and second images, a geometric orientation difference between the first and second orientations, wherein the determination comprises calculating a maximum value for a correlation between the first and second images when varying a translational relative position of the first and second images;

determine a geometric relation between the first and second shapes based on the geometric orientation difference; and produce a data representation of the geometry (10) based on the first shape, the second shape and the geometric relation, wherein the first shape is measured at a time between capturing the first and second images, and wherein a location of the first shape is determined by interpolating between the first and second images.

\* \* \* \* \*